United States Patent Office 3,375,850
Patented Apr. 2, 1968

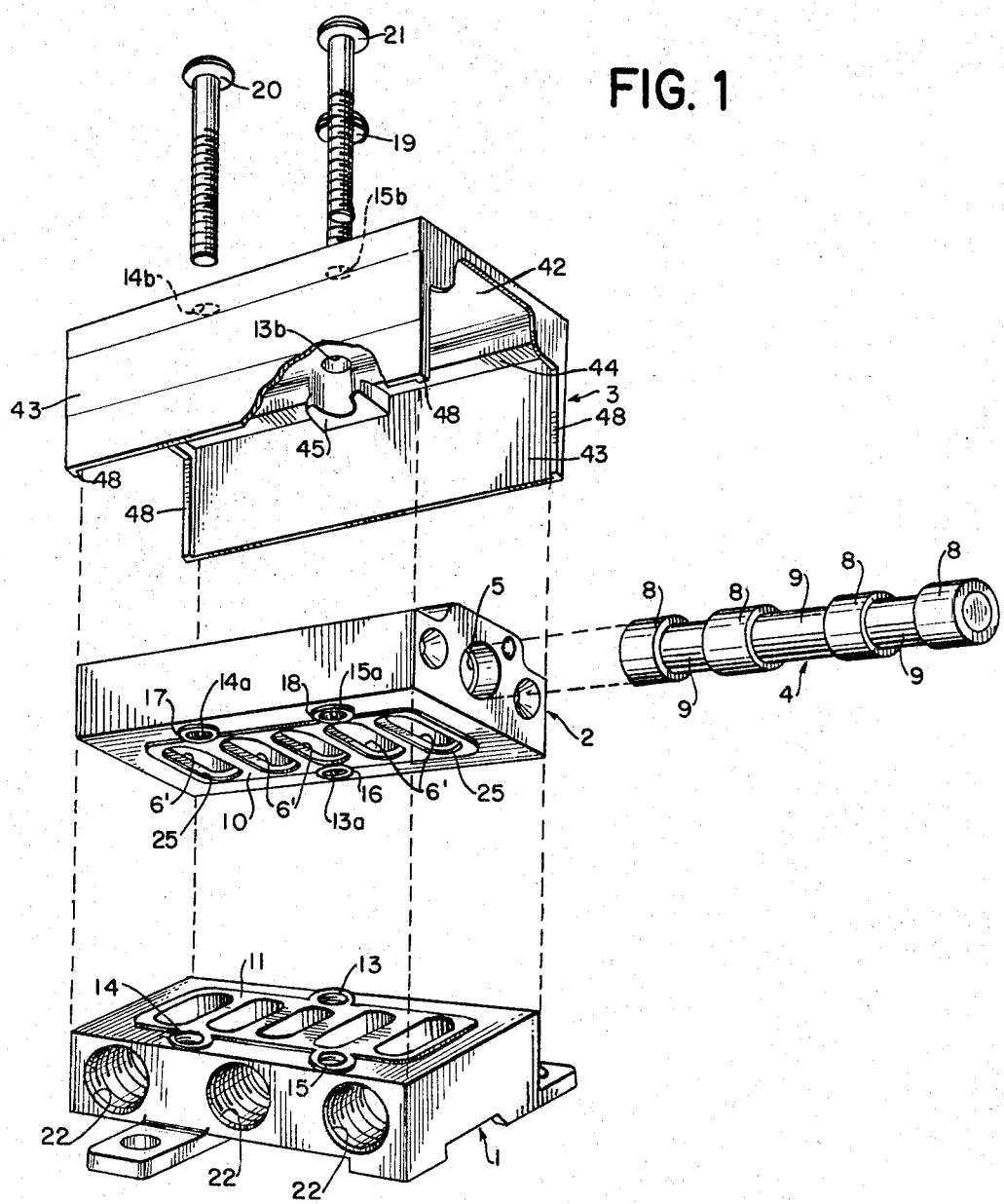

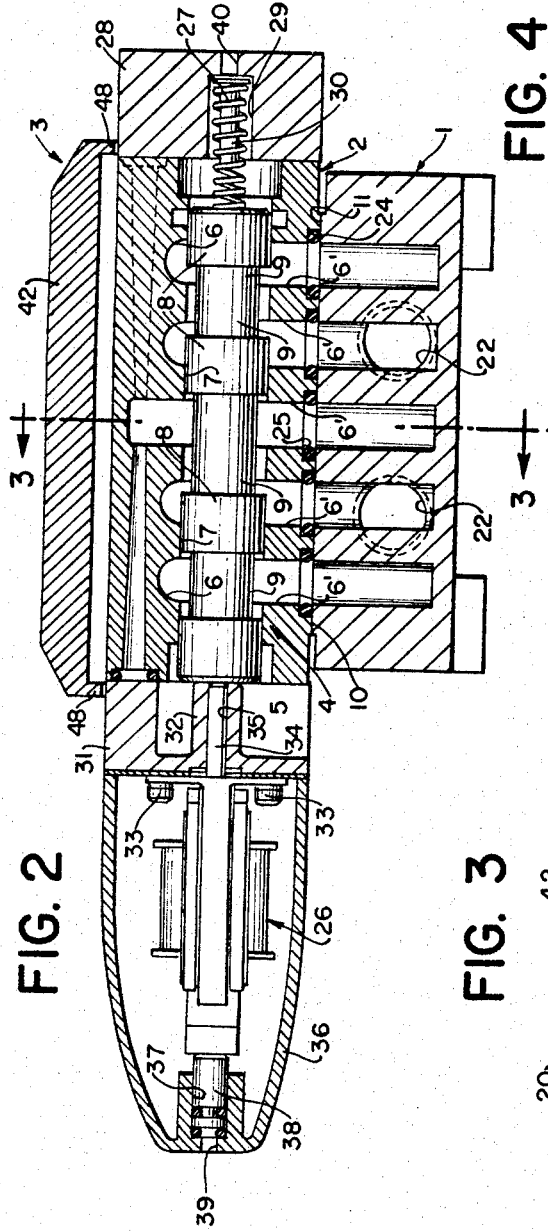
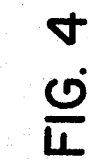
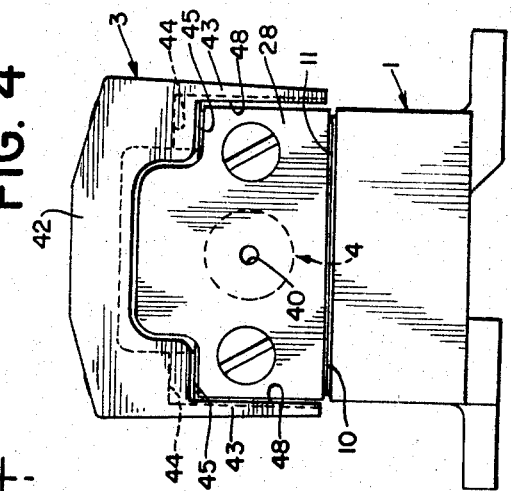
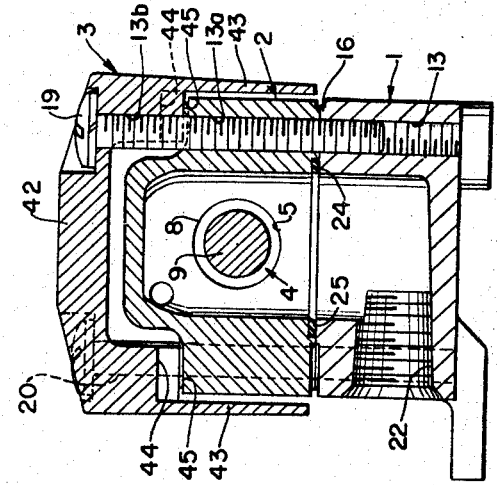
INVENTOR.
WILFRED ASLAN

3,375,850
FLUID VALVE CONSTRUCTION
Wilfred Aslan, Mahwah, N.J., assignor to Alkon Products Corporation, Hawthorne, N.J., a corporation of New York
Filed June 18, 1965, Ser. No. 465,033
17 Claims. (Cl. 137—382)

ABSTRACT OF THE DISCLOSURE

A fluid valve assembly having a valve body with a valve spool slidably mounted therein, a valve base supporting the valve body, and a protective valve bonnet connected to said valve body in covering relationship therewith.

---

In certain types of valves, malfunctioning of the active parts can be used by minor distortion of the valve housing or body portion of the valve as might be caused during handling or use of the valve or during its assembly into a particular flow system. In my U.S. Patent No. 3,060,970, granted Oct. 30, 1962, I have described a spool type of valve construction in which metal-to-metal contact of cooperating surfaces of a valve spool within a surrounding valve body has been used to effectively control the flow of fluid through the valve. As described in my earlier patent, such metal-to-metal contact must be made under conditions of very close tolerances in order to properly seal the spool within the valve housing. This is especially true where the valve is to be used for controlling the flow of air or other gases where the viscosity of the fluid is extremely low. Valves of this construction do eliminate the necessity of providing resilient sealing rings between the valve spool and body but at the same time require that the valve be mounted into the flow system in which it is to be used in such a way whereby distortion of the active valve parts in particular the valve body or housing is avoided. This is so since such distortions, even if very slight, will tend to cause the valve parts to bind and/or lose their sealing effectivness.

Generally, distortion of the active valve parts may occur either during assembly or mounting of the valve into a particular flow system or during handling of the valve before and after it is connected into such a system. My prior patent is primarily concerned with the mounting of these types of valves onto an associated base member in such a way whereby distortion of their active parts is avoided. To effect this result, a three-point mounting construction, forming in effect a tripod support, is provided for supporting the valve along a single plane. When the valve is supported in this way, it will, under normal conditions, be free of distortive forces that might otherwise be caused during the mounting of the valve into the system. Although such mounting constructions take into account the distortive forces that might be created during the assembly or mounting of the valve body onto an associated valve base, it has been found that these valves are also subject to malfunctioning as may be caused by mishandling of the valves either before they are mounted into the flow system or after such mounting.

The valves of the nature described in my prior patent are usually furnished to the customer with the valve body already assembled onto the associated base member which is, in turn, adapted to be secured into the flow system in any conventional manner. However, the valve body portions of such constructions have in the past been left exposed and this has been found to present problems other than those encountered during the actual mounting of the valve into the flow system. For example, the exposed condition of the valve body does render the active parts of the valve susceptible to damage during shippage if they are not carefully packaged or if they are mishandled during such shippage. Also, in connecting the various fluid lines to the ports provided in the base member of the valve, a careless workman might place the valve body within a vice to facilitate the tightening of the fittings to the base member. This, of course, will distort the valve body and, in turn, tend to destroy the alignment of the spool therein. Other damage to the exposed valve body may be caused if the valve is accidentally dropped or if the valve body is knocked during its assembly into the flow system or during the assembly of some adjacent component of the system. Also, it seems to be a universal habit of machine repairmen to rap the valve body with a hammer or other object if it will not operate, believing that the valve spool is hung up due to lack of lubrication when in fact someone has forgotten to connect the valve to a source of current or to connect the associated air lines. Whatever the reasons may be for the improper handling or abuse which these valves receive, it is evident that externally applied forces directed at the valve body do, in fact, tend to interfere with the close tolerances and accurate alignment of the valve parts which must be maintained for an effectively operable valve.

In accordance with the teachings of the present invention, distortion of the active parts of the valve unit as caused by externally applied forces is avoided by isolating the valve body from such forces. This, in turn, is effected by providing a valve bonnet and connecting it to the valve body at three limited areas arranged in a triangular configuration. The areas of contact between the valve bonnet and valve body are disposed in a single plane and the remaining portions of the valve bonnet are spaced from the valve body so that external forces applied to the bonnet will be absorbed thereby and not transferred into the valve body. The points of contact of the bonnet with the body of the valve are aligned with the points of contact between the valve body and its underlying support whereby connection of the valve bonnet to the valve body, and the valve body onto its associated base may be effected by three tension bolts passing through these points of contact from the valve bonnet to the supporting base.

In addition to the above, the valve bonnet of the present invention is advantageously provided at its longitudinal ends with transversely directed end portions. These end portions are adapted to cooperate with suitable valve actuating mechanisms which are, in turn, connected at the opposite longitudinal ends of the valve body for controlling the reciprocation of the valve spool. In accordance with the teachings of the present invention, the transverse spacing between the valve bonnet and the valve actuating mechanisms is made less than that between the valve bonnet and the valve body. In this way, any externally applied forces that are great enough to cause the bonnet to strike the underlying valve body regardless of the spacing between the body and bonnet will instead cause the bonnet to strike the more closely oriented valve actuating mechanisms. This orientation of the parts will, accordingly, lessen to a great extent the tendency of any distortive forces being transferred onto the valve body under even the most severe of conditions.

A more complete understanding of the present invention will be obtained from a reading of the following specification with reference being made to the accompanying drawings of which:

FIG. 1 is an exploded perspective view of the valve assembly of the present invention;

FIG. 2 is a longitudinal, cross-sectional view of a valve assembly of the present invention;

FIG. 3 is a transverse cross-sectional view of the valve assembly shown in FIG. 2; and FIG. 4 is an end view of the valve assembly of the present invention.

As shown in FIGS. 1 and 2, the valve assembly of the present invention generally includes a valve base 1, a valve body 2, valve bonnet 3, and a valve spool 4 adapted to reciprocate within a longitudinal bore provided in the valve body. The valve body 2 is advantageously formed of a material such as 6061–T6 aluminum and may be in the form of a simple block provided with the longitudinal bore 5 and annular recesses 6 forming, in turn, valving lands 7. The active valving and sealing surfaces of the body 2, constituted by the lands 7, are treated to a condition of super-hardness, by techniques well known in themselves. Various ports, such as illustrated at 6', are provided in the valve body, leading to the various recesses 6, in accordance with well-known considerations, so that certain of the recesses communicate with a source of gas under pressure, other recesses communicate with a fluid motor, such as a cylinder (not shown), while still other ports communicate with exhaust.

Slidably received in the bore 5 of the valve body is the valving spool 4 which is formed of a material similar to that used in the body 2. The spool 4 is cylindrical in shape and is provided with a plurality of annular lands 8 and recesses 9. The outer surfaces of the lands 8 are treated to a condition of super-hardness and are precision machined to fit very closely with the lands 7 of the valve body whereby effective valving action may be achieved without the use of resilient sealing elements, such as O-rings.

Effective operation of a valve comprised of surface hardened aluminum body and spool members, utilizing substantial metal-to-metal sealing contact and eliminating entirely the use of resilient sealing elements requires extremely precise initial machine work in order to obtain the low clearances necessary to contain a gas, as distinguished from a hydraulic fluid, for example. Such precision is not difficult to obtain in manufacture since the critical areas are surfaces of revolution which are readily formed with precision machines.

As disclosed in my prior patent, the valve body 2 is advantageously provided with a flat bottom surface 10 substantially complementary to a substantially flat upper surface 11 of the valve base 1; and as shown in FIG. 1, the valve base is provided with three triangularly oriented tapped holes 13–15 aligned with similar untapped holes 13a–15a in the valve body 2. The supporting engagement between the valve base and valve body is in the nature of a tripod. Ideally, the tripod support would be comprised of three points which would define but a single plane. Under such conditions, securing the valve body 2 at the three points of support could not result in distortion of the valve body. In practice, such ideal "point" support is incapable of attainment. However, it is closely approximated by providing annular spacer means 16–18 about each of the holes 13a–15a of the valve body. These spacer means are of limited area and function to space or separate the principal facing surfaces of the valve body and base and in fact constitute the only areas of support for the valve body. In the valve assembly shown in FIG. 1, the annular spacer means take the form of thin annular bosses which may be on the order of 0.003 inch in thickness. The three bosses 16–18 instead of being formed on the body member 2 may be formed on the upper surface of the valve base around or at least partially around the holes 13–15. However, in either case, they constitute three triangularly oriented areas of limited size in relation to the overall area of the valve body and base and thus, constitute the closest practical approach to the theoretically ideal three point contact. Moreover, the annular supporting areas provided by the bosses will immediately surround the connecting bolts 19–21 provided for connecting the valve assembly together so that the compression forces exerted by the bolts will be directly supported in the immediate surrounding areas of the valve body thus avoiding any distorting force couples or the like.

In practice this supporting and connecting arrangement so nearly approaches the theoretically ideal three point support so as to effectively avoid any undesirable distortions of the valve body as might otherwise be encountered in mounting the valve body onto the valve base and this construction enables the valve body and spool of a practical long-life assembly to be formed of surface hardened aluminum and to be operated effectively for the control of air or other gases without the use of resilient sealing elements.

As illustrated in FIG. 2, suitable porting bores 22 are provided in the valve base 1 for communication with the ports 6' provided in the valve body. The connection between these various ports is sealed at the interface between the valve body and base by means of annular seals 24 received in recesses 25 provided at the lower ends of the ports 6' of the valve body. When undistorted, the seals 24 project below the lower surface of the valve body a distance slightly greater than that of the bosses 16–18, so that some distortion of the seals is effected to achieve sealing when the bolts 19–21 are tightened.

In a typical application of a valve structure incorporating the features described above, the valve spool 4 is actuated between its operative valving positions by suitable valve actuating mechanism such as solenoids and springs, for example. The specific valve assembly illustrated in FIG. 2, is, as concerns its valving functions of connecting the ports in predetermined combinations, a four-way valve in which the spool is actuated in one direction (i.e., to the right) by a solenoid 26 and returned by a spring 27.

At the right end of the valve body as viewed in FIG. 2, there is mounted an end cap 28 which forms part of the valve actuating mechanism for returning the valve spool to the left. This cap 28 has an outer transverse dimension corresponding to the outer dimension of the valve body and is provided with an axial recess 29 for receiving an abutment pin 30 and the compressions spring 27. The pin 30 is positioned such that its end surface projects inwardly of the end cap 28 to engage and position the spool 4 at the extreme of its rightward movement. The spring 27 is received in the recess 29, around the shank of the pin 30, and bears simultaneously against the head of the pin at one end and against the spool 4 at the other end to urge the pin 30 into the recess and the spool 4 toward the left.

At the left hand end of the valve body 1, there is mounted a cap 31 which is provided in its central portion with an integral abutment forming boss 32, the end surface of which is adapted to engage and position the spool 4 at the end of its left hand stroke. The solenoid 26 is secured to the cap 31 as by suitable screws 33 and has a plunger rod 34 projecting through an axial bore 35 in the abutment 32. Upon actuation of the solenoid 26, the plunger 34 thereof is extended to the right beyond the end of the abutment 32 engaging the valve spool 4 and urging it to its right hand valving position against the returning force of the spring 27. When the solenoid subsequently is de-energized, the spring 27 returns the spool and the plunger 34 to the positions shown in FIG. 2.

A suitable cover 36 encloses the solenoid 26 and is provided at its left hand end with a recess 37 receiving a pin 38. The pin 38 is accessible through a small opening 39 in the end of the cover whereby a small instrument may be applied to the pin 38 to effect manual actuation of the solenoid where necessary or desirable. Likewise, a small opening 40 is provided in the cap 28 at the right hand end of the valve body whereby a small instrument may be inserted to engage the abutment pin 30 for manual operation of the valve.

In normal operations of the valve, energization and de-energization of the solenoid 26 causes rapid movement of the valving spool 4 from one valving position to another into alternative engagement with the abutment surfaces provided by the pin 30 and projection 32.

In order to cover the valve body 2 in a protective fashion and to effectively isolate it from external forces, a valve bonnet 3 is provided. The bonnet is advantageously formed by a die casting operation from a soft material such as 380 aluminum. Such a material is capable of plastic deformation and thus adapted to absorb impact forces applied to it without permanently deforming the material. As shown in FIG. 1, the bonnet is comprised of a top portion 42 and side portions 43 extending downwardly therefrom at substantially right angles. At the juncture or intersection of the top and side portions of the bonnet, strengthening blocks 44 extending the length of the bonnet are formed. The horizontal section of the bonnet is relatively thick at the top portion so as to effectively make the bonnet resistant to crushing in this area from forces exerted from both the sides and the ends thereof, and strengthening blocks add strength for resisting blows directed at the ends of the bonnet. Also, as will be noted from FIGS. 3 and 4, the outer walls of the side portions 43 are tapered inwardly in a direction extending away from the top of the bonnet so that the bonnet is widest at the horizontal section taken through the top. With this construction, the bonnet may be held in a vise at its top and the compressive forces that will be exerted on the bonnet as the jaws of the vise are closed will be absorbed by the thickened horizontal section and thus prevent the depending side walls from closing down on each other. The advantages of this construction are readily utilized when the bonnet is secured to the valve body in the manner described below; and in effect, prevent the clamping forces exerted by the vise from being transferred to the valve body.

As shown in FIG. 1, the valve bonnet is provided with three holes 13b–15b arranged in a triangular pattern. These holes extend through the top portion of the bonnet and through the underlying block portions and are spaced from each other so as to be in alignment with the holes 13–15 and 13a–15a of the valve base and body, respectively, when the bonnet is placed over the valve body. As with the spacing provided between the valve body and base by the associated bosses 16–18, the valve bonnet is effectively supported on the valve body at three areas of limited size by means of the bosses 45 formed on the undersurface of the block portions 44 immediately adjacent the holes 13b–15b. The internal dimensions of the valve bonnet are made slightly larger than the corresponding external dimensions of the valve body so that when the bonnet is seated on the valve body at the three limited areas defined by the bosses 45, the bonnet will be otherwise spaced from the valve body. In practice, this spacing may be on the order of 1/32 of an inch.

To secure the parts of the valve assembly together, the bolts 19–21 which define tension fastening elements are inserted through the aligned holes 13b–15b, 13a–15a of the valve bonnet and valve body, respectively, and threaded into the tapped holes 13–15 of the valve base to effectively draw the valve bonnet into engagement with the valve body and the valve body into engagement with the valve base at the limited areas defined by the aligned bosses.

With this construction, the valve body will be secured to the valve base in the desired tripod configuration so as to prevent distortion that might otherwise be caused during mounting; and the valve bonnet will likewise be seated on the valve body. In addition to this, the valve bonnet, due to its spacing from the valve body and aided by the physical characteristics of the material from which it is formed, will also act to absorb the impact energy that might be externally applied to it by accidental or deliberate blows and thereby prevent detrimental forces from being transferred to the underlying valve body. The material from which the bonnet is formed will assist in absorbing any impact forces applied to it; and the spacing between the bonnet and valve body will prevent the bonnet, including its side walls, from closing down on the valve body upon receiving externally applied compression or impact forces. Under normal conditions, taking into consideration the usual mishandling and abuse to which the valve assembly will be subjected, a spacing of 1/32 of an inch will be sufficient to prevent contact between the valve body and bonnet side walls.

To further assist in preventing the valve bonnet from closing down on the underlying valve body even under the most severe of conditions, the longitudinal dimension of the bonnet is made greater than that of the underlying valve body and end walls 48 are formed on the bonnet so as to extend inwardly of the bonnet in a direction transverse to the longitudinal axis of the bonnet. As will be seen from FIG. 2, these end portions or walls 48 are disposed over the associated valve actuating mechanisms 26, 27 at the opposite ends of the valve body. In accordance with the teachings of the present invention, the transverse spacing between the bonnet and the valve actuating mechanisms is made less than the transverse spacing between the valve bonnet and the valve body. In practice, this spacing may be about 1/64 of an inch and this will prevent the bonnet from directly contacting the valve body even if the bonnet receives a severe blow along its side since the end portions 48 of the bonnet will, in the first instance, strike the valve actuating mechanisms. Blows directed against the actuators will not as readily tend to bind these members since their movable parts are not fitted with the same degree of tolerance as is required with the valve body and spool. Also, any stresses transmitted to the valve body due to blows received by the actuators will tend to be directed in a direction parallel to the axis of the spool, and the valve body and spool can tolerate higher stresses in this direction without binding than they can in a direction perpendicular to the axis of the spool such as would result from blows struck directly against the sides of the valve body.

It should be understood that the specific form of the invention herein illustrated and described is intended to be representative only and that changes may be made therein without departing from the clear teachings of the disclosure. Accordingly, reference should be made to the following appended claims in determining the full scope of the invention.

I claim:

1. A fluid valve assembly comprising:
   (a) a valve body formed of distortable material having a longitudinal bore therein and valve ports communicating with said bore;
   (b) a valve spool slidably received in said bore and movable to a plurality of operative valving positions to connect said valve ports in predetermined combinations;
   (c) cooperating valving surfaces on said valve body and spool for sealing off certain ports from certain other ports in the various operative positions of said spool;
   (d) a valve base for supporting said valve body thereon;
   (e) a valve bonnet disposed in covering relationship over said valve body;
   (f) valve bonnet spacing means positioned between said valve body and valve bonnet and forming three areas of contact of limited size in relation to the size of said valve body and valve bonnet, said spacing means being arranged in triangular configuration to form, in substantial effect, a tripod contacting engagement between said valve body and valve bonnet; and
   (g) three tension fastening elements extending from said valve bonnet through said valve body and into said valve base immediately adjacent said valve bonnet spacing means for drawing said valve bonnet into engagement with said valve body at the limited areas defined by said valve bonnet spacing means.

2. A fluid valve assembly comprising:
 (a) valve body formed of distortable material having a longitudinal bore therein and valve ports communicating with said bore;
 (b) a valve spool slidably received in said bore and movable to a plurality of operative valving positions to connect said valve ports in predetermined combinations;
 (c) cooperating valving surfaces on said valve body and spool for sealing off certain ports from certain other ports in the various operative positions of said spool;
 (d) a valve base for supporting said valve body thereon;
 (e) rigid valve base spacing means positioned between said valve body and valve base and forming three areas of contact of limited size in relation to the size of said valve body and valve base, said spacing means being arranged in triangular configuration to form, in substantial effect, a tripod contacting engagement between said valve body and valve base;
 (f) a valve bonnet disposed over said valve body;
 (g) valve bonnet spacing means positioned between said valve body and valve bonnet at three separate points disposed in alignment with the valve base spacing means, said valve bonnet spacing means being of limited area with respect to the size of said valve body and forming the sole contact between said valve body and valve bonnet; and
 (h) three tension fastening elements extending from said valve bonnet, through said valve body and into said valve base immediately adjacent said aligned spacing means for drawing said valve bonnet into engagement with said valve body and said valve body into engagement with said valve base at the limited areas defined by the spacing means.

3. The fluid valve assembly as set forth in claim 2 wherein said valve bonnet includes:
 (a) a top portion;
 (b) opposite side portions depending therefrom at substantially right angles; and
 (c) block portions extending along the interior of said valve bonnet at the intersection of said top and side portions.

4. The fluid valve assembly as set forth in claim 3 wherein:
 (a) the outer walls of the opposite side portions of said valve bonnet are inwardly tapered in a direction extending away from the top portion of said valve bonnet.

5. The fluid valve assembly as set forth in claim 3 wherein:
 (a) said valve bonnet spacing means are disposed between said valve body and the block portions of said valve bonnet; and
 (b) said tension fasteners pass through the block portions of said valve bonnet.

6. A fluid valve assembly as set forth in claim 5 wherein:
 (a) said spacing means comprises annular bosses projecting slightly from at least one of each of the opposed mating surfaces of said valve body, valve base and valve bonnet; and
 (b) said tension fastening means comprises three bolts extending between said valve bonnet and valve base and passing through respective ones of said annular bosses.

7. A fluid valve assembly as set forth in claim 6 wherein:
 (a) said valve bonnet is formed of aluminum capable of plastic deformation so as to absorb external impact energy.

8. A fluid valve assembly comprising:
 (a) a valve body formed of deformable material having a longitudinal bore therein and valve ports communicating with said bore;
 (b) a valve spool of deformable material slidably received in said bore and movable to a plurality of operative valving positions to connect said valve ports in predetermined combinations;
 (c) cooperating valving surfaces on said valve body and spool for sealing off certain ports in various operative positions of said spool, said valving surfaces being closely machined from said body and spool and being hardened to provide precise sealing contact between said surfaces;
 (d) a valve base engaging said valve body;
 (e) valve body contacting means disposed between said valve body and valve base and forming three areas of contact of limited size in relation to the size of said valve body and valve base, said contacting means being arranged in triangular configuration to form, in substantial effect, a tripod contacting engagement between said valve body and valve base;
 (f) a valve bonnet disposed over said valve body in engagement with said valve body on the side thereof opposite said valve base and having a top portion and depending side portions covering respectively the top and longitudinally extending sides of said valve body;
 (g) valve bonnet contacting means disposed between said valve body and valve bonnet in alignment with said valve base contacting means and defining the sole area of contact between said valve body and valve bonnet; and
 (h) tension fastening means extending from said valve bonnet, through said valve body and into said valve base immediately adjacent said aligned contacting means for drawing said valve bonnet toward said valve body and said valve body toward said valve base and for maintaining said aligned three-point contacting engagement between said valve bonnet, body and base.

9. A fluid valve assembly as set forth in claim 8 wherein:
 (a) valve actuators are fixed to said valve body at the opposite longitudinal ends thereof; and
 (b) said valve bonnet extends beyond the ends of said valve body to cover at least a portion of the sides and top surfaces of said valve actuators with the transvere spacing between said valve bonnet and valve actuators being less than the transverse spacing between said valve bonnet and valve body.

10. A fluid valve assembly as set forth in claim 9 wherein:
 (a) said valve bonnet at the opposite ends which are positioned beyond the ends of said valve body is provided with inwardly extending transverse end portions facing said valve actuators.

11. A fluid valve assembly as set forth in claim 10 wherein:
 (a) said valve bonnet is formed as an integral unit of aluminum capable of plastic deformation and includes block portions extending longitudinally along the interior thereof at the intersection of the top and side portions.

12. A fluid valve assembly as set forth in claim 11 wherein:
 (a) the side portions of said valve bonnet are inwardly tapered in a direction extending away from the top portion thereof.

13. A fluid valve assembly as set forth in claim 12 wherein:
 (a) the transverse spacing of said valve bonnet from said valve body is about $1/32$ on an inch; and
 (b) the transverse spacing of said valve bonnet from said valve actuators is about $1/64$ of an inch.

14. A valve bonnet for use as a protective cover for a valve mechanism comprising:
(a) a top portion;
(b) opposite portions depending therefrom at substantially right angles, the outer walls of said side portions being inwardly tapered in a direction extending away from said top portion; and
(c) block portions extending along the interior of said valve bonnet at the intersection of said top and side portions.

15. A valve bonnet as set forth in claim 14 wherein:
(a) said top and side portions are formed of aluminum capable of plastic deformation so as to absorb external impact energy.

16. A valve bonnet as set forth in claim 15 further including:
(a) inwardly extending transverse end portions connected at the opposite ends of said top and side portions.

17. A valve bonnet as set forth in claim 16 further including spacing means extending downwardly from said block portions at three separate points, said spacing means being arranged in triangular configuration to form in substantial effect a tripod contacting engaging surface for engagement with said valve mechanism.

References Cited

UNITED STATES PATENTS 3,060,970  10/1962  Aslan _____ 137—625.43 X

M. CARY NELSON, *Primary Examiner.*

J. R. DWELLE, *Assistant Examiner.*

UNITED STATES PATENT OFFICE
CERTIFICATE OF CORRECTION

Patent No. 3,375,850                              April 2, 1968

Wilfred Aslan

It is certified that error appears in the above identified patent and that said Letters Patent are hereby corrected as shown below:

Column 4, line 33, after "right" insert -- hand --. Column 8, line 73, "on" should read -- of --. Column 9, line 4, after "opposite" insert -- side --.

Signed and sealed this 5th day of August 1969.

(SEAL)
Attest:

Edward M. Fletcher, Jr.                        WILLIAM E. SCHUYLER, JR.
Attesting Officer                                    Commissioner of Patents